(12) United States Patent
Durkic et al.

(10) Patent No.: US 11,505,679 B2
(45) Date of Patent: Nov. 22, 2022

(54) COMPOSITION FOR THREE-DIMENSIONAL PRINTING, A METHOD FOR PREPARATION THEREOF AND USES THEREOF

(71) Applicant: DYNEA AS, Lillestrøm (NO)

(72) Inventors: Kristina Durkic, Lillestrøm (NO); Rory Morrish, Lillestrøm (NO); Edward John Sutcliffe, Skedsmokorset (NO)

(73) Assignee: DYNEA AS, Lillestrøm (NO)

( * ) Notice: Subject to any disclaimer, the term of this patent is extended or adjusted under 35 U.S.C. 154(b) by 349 days.

(21) Appl. No.: 16/613,827

(22) PCT Filed: May 16, 2018

(86) PCT No.: PCT/EP2018/062756
§ 371 (c)(1),
(2) Date: Nov. 15, 2019

(87) PCT Pub. No.: WO2018/210939
PCT Pub. Date: Nov. 22, 2018

(65) Prior Publication Data
US 2020/0181367 A1 Jun. 11, 2020

(30) Foreign Application Priority Data
May 16, 2017 (NO) .................................. 20170811

(51) Int. Cl.
| | | |
|---|---|---|
| C08L 1/02 | (2006.01) | |
| B29C 64/118 | (2017.01) | |
| C08K 5/053 | (2006.01) | |
| C08K 5/092 | (2006.01) | |
| C08L 61/24 | (2006.01) | |
| C08L 61/28 | (2006.01) | |
| C08L 97/02 | (2006.01) | |
| B33Y 10/00 | (2015.01) | |
| B33Y 80/00 | (2015.01) | |

(52) U.S. Cl.
CPC .............. *C08L 1/02* (2013.01); *B29C 64/118* (2017.08); *C08K 5/053* (2013.01); *C08K 5/092* (2013.01); *C08L 61/24* (2013.01); *C08L 61/28* (2013.01); *C08L 97/02* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 2,557,826 A | * | 6/1951 | Keaton | C09J 161/06 156/335 |
| 2,574,784 A | * | 11/1951 | Heritage | C09J 161/06 527/303 |
| 2,579,793 A | * | 12/1951 | Cassel | D06P 1/44 524/45 |
| 4,194,996 A | * | 3/1980 | Babina | C08L 61/06 524/14 |
| 4,961,795 A | * | 10/1990 | Detlefsen | B27D 1/04 156/335 |
| 2004/0038009 A1 | * | 2/2004 | Leyden | B29C 64/165 428/206 |
| 2015/0017425 A1 | * | 1/2015 | Schade | B27N 3/08 264/331.19 |
| 2018/0264851 A1 | * | 9/2018 | De Roeck | B41J 3/4078 |
| 2020/0181367 A1 | * | 6/2020 | Durkic | C09J 161/28 |

FOREIGN PATENT DOCUMENTS

| | | |
|---|---|---|
| CN | 103275381 A | 9/2013 |
| CN | 103665905 A | 3/2014 |
| CN | 104356618 A | 2/2015 |
| CN | 104893334 A | 9/2015 |
| CN | 105295158 A | 2/2016 |
| CN | 105778395 A | 7/2016 |
| CN | 105778399 A | 7/2016 |
| CN | 105820527 A | 8/2016 |
| CN | 106280339 A | 1/2017 |
| CN | 107312287 A | 11/2017 |
| WO | WO 2007/114895 A2 | 10/2007 |

OTHER PUBLICATIONS

Siqueira et al: "Cellulose Nanocrystal Inks for 3D Printing of Textured Cellular Architectures", Advanced Functional Materials, vol. 27, No. 12,(2017), p. 1604619.

Pattinson et al: "Additive Manufacturing of Cellulosic Materials with Robust Mechanics and Antimicrobial Functionality", Advanced Materials Technologies, vol. 2, No. 4,(2017), p. 1600084.

(Continued)

*Primary Examiner* — Peter A Salamon
(74) *Attorney, Agent, or Firm* — Ballard Spahr LLP

(57) ABSTRACT

The disclosure concerns a composition for three-dimensional printing, said composition being free from polylactic acid (PLA) and includes the following components:

(a) a polysaccharide comprising a cellulose derivative and/or a lignocellulosic derivative;

(b) a pH regulator selected from at least one of the following: organic acids, inorganic acids, acid generating salts, bases, buffers, (c) a resin selected from melamine resin and/or phenol resin, and (d) optionally a rheology modifier selected from water and/or glycerol.

The disclosure also concerns a kit of parts for producing the described composition, a method for three-dimensional printing of the described composition and articles obtainable by said method.

7 Claims, No Drawings

(56) References Cited

OTHER PUBLICATIONS

International Search Report and Written Opinion were mailed on by the International Searching Authority for International Application No. PCT/EP2018/062756, filed on May 16, 2018 and published as WO 2018/210939 dated Nov. 22, 2018 (Applicant-DYNEA AS) (9 Pages).
Wu, "Modulation, functionality, and cytocompatibility of three-dimensional printing materials made from chitosan-based polysaccharide composites", Materials Science and Engineering: C, vol. 69, Dec. 1, 2016, pp. 27-36.

* cited by examiner

1

COMPOSITION FOR THREE-DIMENSIONAL PRINTING, A METHOD FOR PREPARATION THEREOF AND USES THEREOF

CROSS-REFERENCE TO RELATED APPLICATIONS

This application is a U.S. National Phase Application of International Application No. PCT/EP2018/062756, filed May 16, 2018, which claims priority to Norwegian Application No. 20170811, filed May 16, 2017, each of which are hereby incorporated by reference in their entirety.

TECHNICAL FIELD

The present disclosure concerns three-dimensional printing. More specifically, the present disclosure concerns three-dimensional printing of a composition comprising at least one polysaccharide, a pH regulator, a resin and a rheology modifier, a method for preparing said composition as well as uses of said composition.

BACKGROUND

Three-dimensional printing has attracted considerable interest due to its simplicity and efficiency, and is increasingly being used as a complement to and/or replacement of traditional manufacturing.

Three-dimensional printing refers to the process of joining materials to make objects from three-dimensional model data, usually layer upon layer. Three-dimensional printing is also known as additive manufacturing, additive fabrication, additive processes, additive techniques, additive layer manufacturing, layer manufacturing, and freeform fabrication.

A common three-dimensional printing technique is laser sintering of metal powder, wherein the metal powder is melted into the shape of a given layer. Plastics are also common materials used in three-dimensional printing. The plastic may comprise a biodegradable plastic such as polylactic acid (PLA) or an oil-based plastic such as acrylonitrile-butadiene styrene (ABS).

Three-dimensional printing increases efficiency of new product introduction due to easier prototyping, reduces waste and allows for producing items of great geometrical complexity. It has therefore become a valuable tool for manufacturing of objects in many different fields such as dentistry and aerospace.

Compared to traditional manufacturing, three-dimensional manufacturing is considered a more sustainable way of producing objects since it involves less waste, facilitates production on demand and may allow for onsite production thereby avoiding transportation and complicated logistics.

Thus, technical advantages, economic benefits as well as environmental concerns have prompted the development in the field of additive manufacturing. For instance, printers for three-dimensional printing are now available not only for metal powders but also for e.g. molten, liquid or semi-liquid material.

While three-dimensional manufacturing has mainly been used in the field of powder metallurgy there is now a demand for expanding this technique into other areas.

CN 105295158 discloses a flexible wear-resistant soft plastic including polyethylene and polypropylene.

CN105778399 discloses a 3D printing material with the function of trapping and killing insects and a preparation method thereof. The preparation includes acrylonitrile butadiene styrene copolymers and a small amount of walnut shell ultrafine powder.

CN105778399 discloses a bacteriostatic 3D printing material easy in molding and a preparation method thereof. The preparation includes acrylonitrile butadiene styrene copolymers and a small amount of walnut shell ultrafine powder.

However, there is a demand for use of sustainable, eco-friendly and biodegradable products and processes for making thereof. The processes and products of the documents above involve non-biodegradable materials such as polyethylene, polypropylene and acrylonitrile butadiene styrene copolymers.

CN 103665905 discloses a three-dimensional wood printing supply which comprises components in percentage by mass as follows: 60%-90% of wood meal, 3%-15% of ABS (acrylonitrile butadiene styrene) plastics, 4%-15% of PLA (poly lactic acid), 2%-10% of PHA (polyhydroxyalkanoate), 1%-2% of PP (polypropylene) and 1%-2% of a compatibilizer.

Thus, polylactic acid (PLA) has been reported to be involved in applications where biodegradability is desired. PLA is attractive from a sustainability point of view, since it is known to be biodegradable. However, PLA is also known to be associated with disadvantages such as low resistance to high heat and humidity, low flexibility, hydrolysis at high humidity and low durability.

Therefore, it would be desirable to provide a biodegradable material or at least partly biodegradable material allowing to overcome and/or mitigate at least some of the disadvantages associated with PLA such as the low durability.

In particular, it would be desired to apply the technique of three-dimensional printing to sustainable, recyclable, biodegradable and/or eco-friendly materials lacking PLA thereby enhancing the beneficial environmental aspects and yet overcoming or mitigating some of the disadvantages associated with PLA, It is an object of the present disclosure to mitigate and/or overcome some of the disadvantages mentioned above. Further, it is an object of the present disclosure to provide a biodegradable composition.

Further, it is an object of the present disclosure to increase the versatility of three-dimensional printing.

SUMMARY

The present disclosure provides a composition for three-dimensional printing, said composition being free from polylactic acid (PLA) and comprising the following components:

(a) a polysaccharide comprising a cellulose derivative and/or a lignocellulosic derivative;

(b) a pH regulator selected from at least one of the following: organic acids, inorganic acids, acid generating salts, buffers, acidic polymers, bases, (c) a resin selected from melamine resin and/or phenol resin, and (d) optionally a rheology modifier selected from water and/or glycerol.

The present disclosure also provides a kit of parts for providing a composition as described herein, wherein said kit of parts comprises:

(i) a first component comprising a pH regulator as described herein, (ii) a second component comprising a resin as described herein, wherein said first component and/or said second component further comprise(s):
   a polysaccharide as described herein, and
   optionally one or more of the following: a binder as described herein; a filler as described herein, a functionality carrier as described herein, a further rheology modifier as described herein.

Further, the present disclosure provides a method for three-dimensional printing of a composition as described herein, said method comprising the steps of:
   (a)
   combining the first component and the second component as described herein into a paste, or
   adding water and/or glycerol to the powder composition as described herein thereby providing a paste,
   (b) optionally adding a binder as described herein, a filler as described herein, a functionality carrier as described herein and/or a further rheology modifier as described herein,
   (c) producing at least one layer comprising the paste,
   (d) optionally combining several of said at least one layer, and
   (e) curing said at least one layer.

Further, the present disclosure provides a method for three-dimensional printing of a powder composition as described herein, said method comprising the steps of:
   (a) providing a layer comprising or consisting of a powder composition as described herein,
   (b) adding a rheology modifier selected from water and/or glycerol to said layer and/or a further rheology modifier as described herein,
   (c) optionally repeating steps (a) and (b), and
   (d) curing.

There is also provided an article obtainable by the method(s) described herein as well as use of said articles in recycling.

DESCRIPTION

In accordance with the present disclosure, there is provided a composition for three-dimensional printing, said composition being free from polylactic acid (PLA) and comprising the following components:
   (a) a polysaccharide comprising a cellulose derivative and/or a lignocellulosic derivative;
   (b) a pH regulator selected from at least one of the following: organic acids, inorganic acids, acid generating salts, buffers, acidic polymers, bases.
   (c) a resin selected from melamine resin and/or phenol resin, and
   (d) optionally a rheology modifier selected from water and/or glycerol.

The composition may comprise:
   (d) a rheology modifier selected from water and/or glycerol; thereby forming a paste. Thus, the composition may be provided as a paste.

Alternatively, the composition does not comprise:
   (d) a rheology modifier selected from water and/or glycerol; thereby forming a powder. Thus, the composition may be provided as a powder.

The at least one polysaccharide comprising a cellulose derivative and/or lignocellulose derivative may be selected from at least one of the following: wood fibres, sander dust, sawing dust, lignocellulosic fibres, lignocellulosic paste, lignocellulosic powder, cellulose powder, cellulose paste, regenerated cellulose, lignocellulosic composite. For instance, the at least one polysaccharide comprising a cellulose derivative and/or lignocellulose derivative may comprise or consist of a cellulose such as cellulose powder. In an example, the at least one polysaccharide comprising a cellulose derivative and/or a lignocellulosic derivative is selected from at least one of the following: wood fibres, bamboo fibres, sander dust, sawing fibres. In still a further example, the regenerated cellulose or lignocellulosic composite comprises or consists of recycled fibre board.

The composition of the present disclosure allow(s) for use of eco-friendly materials including wood fibres, sander dust and sawing fibres. Some of these materials, such as sander dust and/or sawing fibres, currently find no or little use and are frequently disposed of by, for instance, burning. The composition and method described herein allow for use of such materials, which is a significant benefit from both an environmental and economic point of view. Moreover, the articles produced from the composition described herein may be recyclable thereby further lowering the environmental impact. These articles may in fact be recycled as part of the composition described in here.

The pH regulator described herein may be an organic acid such as formic acid and/or oxalic acid. Further, the pH regulator may be an organic acid, an inorganic acid, an acid generating salt or a mixture thereof. For example, the pH regulator may be selected from at least one of the following: formic acid, oxalic acid, ammonium sulphate. The pH regulator may also be an acidic polymer such as polyvinyl acetate (PVAc).

The resin described herein may be an amino resin comprising or consisting of melamine urea formaldehyde (MUF) and/or melamine formaldehyde (MF). For instance, the melamine urea formaldehyde resin may comprise from about 2.5 wt % to about 40 wt % of melamine, and have a molar ratio formaldehyde:amino groups from about 0.35:1 to about 1:1. In an example, the melamine urea formaldehyde resin may comprise more than about wt % of melamine and have a ratio formaldehyde:amino groups of about 0.9:1. The amino resin may be moisture resistant.

The composition described herein may further comprise at least one of the following components:
   (e) a binder such as a binder selected from at least one of the following: starch, lignin, protein,
   (f) a filler such as a filler selected from at least one of the following: fibrous filler, organic filler, inorganic filler, silica, colour pigment,
   (g) a functionality carrier such as a functionality carrier selected from at least one of the following: metallic particles, carbon, glass particles, caprolactam,
   (h) a further rheology modifier such as a further rheology modifier selected from at least one of the following: acrylic polymers, alginates, gums derived from cellulose, cellulose fibres, polyethylene, a derivative of any of the foregoing.

Examples of phenyl resin include an aromatic hydroxyl compound-aldehyde resin and/or a phenol resin such as phenol-resorcinol resin.

The starch binder may be corn starch and/or modified corn starch.

The binder described herein may be mixed with a further binder selected from: aromatic alcohols, soy binders, water-based dispersion adhesive of at least one polymer comprising polyvinyl acetate and/or polyvinyl alcohol, aromatic hydroxyl compound-aldehyde resin, tannin based binder, polyurethane. Examples of aromatic hydroxyl compound-aldehyde resin include phenol resin and phenol-resorcinol resin.

The filler described herein may aid in providing the composition described herein with desired volume, handling properties, colour etc.

The organic filler described herein may be at least one of the following: cellulose fibres, algenite, cork, latex, wax, shellac, gum arabic.

Further, the inorganic filler described herein may be at least one of the following: kaolin, ground glass, glass fibre, carbon fibre, carbonate fibres, carbon tubes, concrete such as concrete powder. The inorganic filler may comprise or consist of clay and/or modified clay. In this document, clay is understood to comprise mainly phyllosilicate minerals and water. Modified clay is understood to include an additive in addition to the phyllosilicate minerals and water.

The functionality carrier described herein may function as a fire-retardant. Additionally or alternatively, the functionality carrier may impart flexibility, impermeability, water absorption resistance and/or conductivity such as electric conductivity.

The rheology modifier and/or further rheology modifier described herein allows for imparting a desired consistency, flow, share thinning properties and/or thixotropic properties to the paste and/or composition described herein. Additionally, the rheology modifier may be selected to impart desired characteristics to an article produced from said paste and/or composition. For instance, the rheology modifier may evaporate from the article so that it solidifies, shrinks and/or becomes less sticky.

There is also provided a composition as described herein, wherein said composition comprises equal to or above 10 wt %, wt %, 30 wt %, 40 wt %, 50 wt %, 60 wt %, 70 wt % or 80 wt % of a polysaccharide as described herein based on the total weight of said composition.

There is also provided a composition as described herein, wherein said composition comprises equal to or above 10 wt %, wt %, 30 wt %, 40 wt %, 50 wt %, 60 wt %, 70 wt % or 80 wt % of a filler as described herein based on the total weight of said composition.

There is also provided a composition as described herein, wherein the amount of the components based on the total amount of the composition is:
 from 10 wt % to 87 wt % of the polysaccharide comprising a cellulose derivative and/or lignocellulose derivative,
 from 0.1 wt % to 10 wt % of the pH regulator,
 from 5 wt % to 70 wt % of the resin and binder,
 from 1 wt % to 10 wt % of the filler,
 0.1 to 10 wt % of the functionality carrier,
 water, glycerol and/or binder present in an amount up to 100 wt %. Alternatively, the filler, water, glycerol and/or binder may be used as balance.

The composition described herein may be prepared from a kit of parts comprising at a first and a second component, respectively, which upon mixing form the composition. Thus, there is provided kit of parts for providing a composition as described herein, wherein said kit of parts comprises:
 (i) a first component comprising a pH regulator as described herein,
 (ii) a second component comprising a resin as described herein, wherein said first component and/or said second component further comprise(s):
  a polysaccharide as described herein, and
  optionally one or more of the following: a binder as described herein; a filler as described herein, a functionality carrier as described herein, a further rheology modifier as described herein.

It will be appreciated that the kit of parts described herein is free from polylactic acid (PLA).

The first component and/or the second component of the kit of parts described herein may further comprise a rheology modifier selected from water and/or glycerol thereby providing a first paste and/or a second paste, respectively. Thus, both or one of the first and second components may be provided in the form of a paste. For instance, the first component of the kit of parts described herein may further comprise a rheology modifier selected from water and/or glycerol thereby providing a first paste. Additionally or alternatively, the second component of the kit of parts described herein may further comprise a rheology modifier selected from water and/or glycerol thereby providing a second paste.

In a further example, one of the components of the kit of parts described herein may be in the form of a powder. For instance, one of the components may be in the form of a powder while the other component may be in the form of a paste.

It will be appreciated that the composition and/or components as described herein may be provided in substantially homogenous form.

The kit of parts may comprise further components such as a third component. The further components may be a component as described herein, e.g. a filler, a rheology modifier etc.

It will be appreciated that the composition and components described herein may be biodegradable, i.e. being capable of being broken down/decomposed by the action of living organisms such as microorganisms. In particular, the biodegradability may involve decomposition into products that are substantially innocuous to humans and/or the environment. Thus, the composition and components described herein may be entirely biodegradable. Alternatively, the composition described herein may be biodegradable to a considerable extent such as to an extent equal to or above 70 wt %, 80 wt %, 90 wt % or 95 wt %. In the latter case the composition may contain non-biodegradable components to a limited extent such as to an extent equal to or less than 30 wt %, wt %, 10 wt % or 5 wt %. Examples of non-biodegradable components that may be present to such a limited extent include polyethylene (PE), polypropylene (PP), melamine and/or acrylonitrile butadiene styrene copolymer (ABS).

Thus, the present disclosure provides a kit of parts as described herein, wherein the first component in addition to the pH regulator described herein comprises a rheology modifier selected from water and/or glycerol and/or a further rheology modifier as described herein thereby being provided as a paste and the second component is provided in the form of a powder. Alternatively, the first component may be in the form of a powder while the second component in addition to the resin described herein comprises a rheology modifier selected from water and/or glycerol and/or a further rheology modifier as described herein thereby being provided as a paste.

The kit of parts described herein may include instructions for use. The instructions for use may be instructions for use in three-dimensional printing. The instructions may include instructions for how to prepare the first component, the second component and/or how to combine said first component and second component. The instructions may further describe how to use the composition, such as the paste, resulting from combination of said first and second components in three-dimensional printing.

The present disclosure also provides a method for three-dimensional printing of a composition as described herein, said method comprising the steps of:

(a)
 combining the first component and the second component as described herein into a paste, or
 adding water and/or glycerol to the powder composition as described herein thereby providing a paste, (b) optionally adding a binder as described herein, a filler as described herein, a functionality carrier as described herein and/or a further rheology modifier as described herein, (c) producing at least one layer comprising the paste, (d) optionally combining several of said at least one layer, and (e) curing said at least one layer.

The first paste and the second paste described herein may be combined using ordinary means in the art such as mixing using an Archimedean screw. The combination of the first paste and the second paste may take place just prior to the extrusion of the at least one layer. The ratio between the first and second paste may vary depending on inter alia the composition of the pastes and/or the desired end result. For instance, the first and second pastes may be mixed in a weight ratio from about 30:70 to about 70:30.

The at least one layer of the method described herein may be produced using extrusion. Thus, steps c) and/or d) of the method described herein may involve extrusion into an article. Further, step e) may involve curing of an article. The at least one layer may then be combined with a further layer. Curing of the at least one layer such as a combination of layers may take place after production of said at least one layer and/or after all desired have been combined. Depending on the circumstances, the skilled person may decide when curing should take place. The curing may take place using a method known to the person skilled in the art and which is suitable for the particular application. For instance, the curing may involve light such as UV (Ultraviolet Light), IR (infrared radiation), LED (Light Emitting Diode), application of a specific temperature, pressure, vacuum and/or humidity. It will be appreciated that the curing may be drying such as drying at room temperature, i.e. from about 20° C. to about 22° C.: The drying may take place immediately after extrusion. Thus, the curing described may include drying such as drying at a temperature equal to or above 18° C. During the curing a chemical reaction such as cross-linking takes place.

The present disclosure also provides a method for three-dimensional printing of a powder composition as described herein, said method comprising the steps of:

(a) providing a layer comprising or consisting of a powder composition as described herein, (b) adding a rheology modifier selected from water and/or glycerol to said layer and/or a further rheology modifier as described herein, (c) optionally repeating steps (a) and (b), and (d) curing.

The curing may take place as described herein. Further, the layer may be from about 0.1 mm to about 0.3 mm. The rheology modifier and/or the further rheology modifier may function as an interface agent between the layers. Additionally or alternatively, the rheology modifier and/or further rheology modifier may function as an adhesion promotor so that the layers adhere to each other. Moreover, additional components such as the components described herein may be added in between the layers.

One or more of the steps of the method(s) described herein may take place at room temperature, i.e. at about from 20° C. to about 22° C. Thus, the method(s) described herein may take place without heating.

The at least one layer produced in the method(s) described herein may be combined with a further layer that is not produced in accordance with the method described herein. For instance, the further layer may comprise or consist of veneer, cement, glass fibres, woven material and/or non-woven material. Accordingly, the article produced in accordance with the method(s) described herein may include a further layer such as a layer comprising or consisting of veneer, cement, glass fibres, woven material and/or non-woven material. For instance, the article may include several layers that are joined together (i.e. joint layering) such as one or more layers produced in accordance with the method described herein in combination with layers comprising or consisting of one or more of layers of veneer, cement, glass fibres, woven material and/or non-woven material. The layer produced in accordance with the method(s) described herein may act as a chemical of physical joints.

In this document, three-dimensional printing intends the process of joining materials to make objects from three-dimensional model data. The three-dimensional model data may be provided from a digital file. The way of joining may be by adding layer to layer. The three-dimensional printing method described herein is a printing method for biopolymers such as polysaccharides comprising a cellulose derivative and/or lignocellulose derivative. It will be appreciated that the three-dimensional printing process described herein may be used in combination with other manufacturing techniques. Further, the three-dimensional method described herein may involve extrusion.

During the extrusion described herein, the layer size can be easily increased by regulating size or design of the nozzle. Nozzle design can be circular, squared, or in rectangular or triangle shape. The extrusion can be done through one nozzle opening, or it can be done through several nozzles. With such design, layer width can be extended to several meters. The layer height may vary. For instance, the layer height may be up to 10 millimeters (mm).

It will be appreciated that the method described herein does not involve polylactic acid. Additionally, the method described herein may be free from non-biodegradable components or contain biodegradable components to a limited extent as described herein.

Advantageously, the method(s) of the present disclosure do(es) not involve supply of heat and/or energy. For instance, the method(s) of the present disclosure do(es) not involve heating and/or cooling. The energy supply used in the method may involve electrical power to pumps, stirrers and/or mixers. This is a significant benefit, since it simplifies manufacturing and allows for lowering the environmental impact due to less energy consumption.

The present disclosure also provides an article obtainable by the method(s) described herein. The articles may have sound isolating properties.

Examples of articles obtainable by the method described herein include headphone, prosthetic device, mold, decorative object, temporary object, furniture, wearables, biodegradable objects, facades, implants, toys, skis, construction parts, walls, composite material. For instance, the article may be a composite material.

The articles described herein may be recycled. The recycling may involve crushing, shredding and/or melting of the article. For instance, recycling may take place by using the articles as raw material in the method(s) described herein.

The composition in the form of a paste as described herein may be a viscous fluid suitable for the intended printing purpose. For instance, the paste may be printed using a method including extrusion of said paste. Thus, it will be appreciated that the kind of printing will be decisive for the desired consistency of the paste. In some applications, it may be desired to have a thick viscous fluid while fluids with a lower viscosity may be preferred in other applications. The present disclosure allows for adjusting the viscosity of the paste to suit a particular application by varying the amounts of the composition components. Further, the rheology modifier described herein may be selected to provide a paste with suitable printing properties and still allow the article printed from the paste to have a different viscosity than that of the paste due to e.g. solvent volatility.

It will be appreciated that addition of a rheology modifier to the pastes of (i) and/or (ii) in the kit of parts described herein may involve processing into a substantially homogenous paste of a desired viscosity. For some applications, it may be desired that (i) and (ii) have substantially the same viscosity. Alternatively, it may be desired that (i) and (ii) are of different viscosity. For instance, the viscosity of (i) may be higher than that of (ii) or vice versa. Further, when (i) and (ii) are combined additional components such as a rheology modifier may be added to impart desired properties to the paste resulting from combination of (i) and (ii).

It will be appreciated that the article described herein may be further processed and post-treated to a desired end use. The processing and post-treatment may include coating, paint-spraying treatment, oven curing, polishing, drilling, cutting etc.

The method described herein as well as the articles obtainable by said method involves a negative carbon footprint due to inter alia the use of eco-friendly materials. Further, the method described herein also exhibits the benefits of improving printing speed and/or allowing for printing of articles on a large scale.

Preparation of the Paste

In the following, methods for preparing a paste in accordance with the present disclosure are provided.

In an example, lignocellulose material was mixed with a pH regulator, a rheology modifier and a functionality carrier to form a homogenous first paste. A second homogenous paste was prepared by mixing a binder with a rheology modifier. The first and second homogenous pastes can then be mixed in a ratio from about 30:70 to about 70:30 ratio using for example an archimedean screw The mixing may take place just prior to extruding the paste resulting from the mixing of the first and second pastes.

In a further example, lignocellulose material was mixed with a pH regulator, a rheology modifier and a functionality carrier to form a first homogenous paste. A second homogenous paste was prepared by mixing lignocellulose material with a binder and rheology modifiers. The mixing of the first homogenous paste and the second homogenous paste may take place just prior to extruding the paste resulting from the mixing of the first and second pastes.

In still a further example, lignocellulose material was mixed with the binder, and pH regulator to form a first homogenous powder mix component. The second component was prepared by mixing rheology modifiers to the homogenous paste. The components can be mixed in about 50:about 50 ratio using for example archimedean screw, just prior to the extrusion.

In this example, lignocellulose material was mixed with a binder, a pH regulator and rheology modifiers to form homogenous powder mix. A paste was then prepared by adding the water as the rheology modifier to the homogenous powder mix.

In this example, lignocellulose material was mixed with a pH regulator and rheology modifier to form a first homogenous paste. A second homogenous paste was prepared by mixing binder and rheology modifier. A third paste was prepared by mixing functionality carrier with the rheology modifiers to form a homogenous paste. The first, second and third pastes can be mixed in a ratio of from about 30:65:5 to about 65:35:5 ratio using for example archimedean screw, just prior to extruding resulting in a homogenious extrudable mix.

It will be appreciated that the disclosure is not limited by the embodiments described above, and further modifications of the disclosure within the scope of the claims would be apparent to a skilled person.

Further Aspects

The present disclosure also comprises the following aspects.

Further Aspect. 1:

A composition for three-dimensional printing comprising:
(a) at least one polysaccharide comprising a cellulose derivative and/or lignocellulose derivative,
(b) at least one binder comprising one or more additional polymers,
(c) optionally at least one pH regulator.

Further Aspect 2:

A composition according to aspect 1, wherein said at least one polysaccharide comprising a cellulose derivative and/or lignocellulose derivative is selected from at least one of the following: wood fibres, sander dust, sawing dust, lignocellulosic fibres, lignocellulosic paste, lignocellulosic powder, cellulose powder, cellulose paste, cellulose fibres, regenerated cellulose, lignocellulosic composite.

Further Aspect 3:

A composition according to aspect 1 or 2, wherein the at least one binder comprising one or more additional polymers is selected from at least one of the following: bio-based polymer, polymer dispersion, amino resin, aromatic hydroxyl compound-aldehyde resin, starch based binder, lignin based binder, tannin based binder, polyurethane.

Further Aspect 4:

A composition according to any one of the preceding aspects, wherein the at least one pH regulator is selected from at least one of the following: organic acid, inorganic acid, acid generating salt, ammonium salt, base and buffer.

Further Aspect 5:

A composition according to any one of the preceding aspects, further comprising at least one of the following:
(d) filler,
(e) functionality carrier,
(f) rheology modifier.

Further Aspect 6:

A composition according to any one of the preceding aspects, wherein the filler is at least one of the following: fibrous filler, organic filler, inorganic filler, silica, colour pigment.

Further Aspect 7:

A composition according to aspect 6, wherein:
the organic filler is at least one of the following: cellulose fibres, algenite, cork, latex, wax, shellac, gum arabic and/or the inorganic filler is at least one of the following: kaolin, ground glass, glass fibre, carbon fibre, carbonate fibres, tubes, concrete powder.

Further Aspect 8:
A composition according to aspect 7, wherein the inorganic filler further comprises clay and/or modified clay.

Further Aspect 9:
A composition according to any one of the preceding aspects, wherein the functionality carrier is at least one of the following: metallic particles, carbon, glass particles, or any combination thereof.

Further Aspect 10:
A composition according to any one of the preceding aspects, wherein the rheology modifier is selected from the group consisting of: at least one of the following: acrylic polymers, alginates, gums derived from cellulose, cellulose fibres, polyethylene, or a derivative of any of the foregoing, water, glycerol, waxes and any combination of the foregoing.

Further Aspect 11:
A composition according to any one of aspects 5-10, wherein the amount of the components based on the total amount of the composition is:
(a) from 10 wt % to 87 wt % of the at least one polysaccharide comprising a cellulose derivative and/or lignocellulose derivative;
(b) from 5 wt % to 70 wt % of the at least one binder comprising one or more additional polymers;
(c) from 0.1 to 10 wt % of the at least one pH regulator;
(d) from 1 wt % to 10 wt % of the at least one filler,
(e) from 0.1 wt % to 10 wt % of the at least one functionality carrier, and
(f) from 0.1 wt % to 10 wt % of the at least one rheology modifier.

Further Aspect 12:
A composition according to any one of the preceding aspect which is in the form of a powder or a paste.

Further Aspect 13:
A kit of parts comprising:
a composition as defined in any one of the preceding aspects, and
instructions for use in three-dimensional printing.

Further Aspect 14:
A method for preparing a composition according to any one of the preceding aspects, said method comprising the steps of:
adding a rheology modifier (f) as defined in any one of aspects 5-12 to
(i) component (b), i.e. at least one binder comprising one or more additional polymers as described herein, an optionally one or more of components (a), (c), (d), (e) and (f) as described herein, and/or
(ii) component (c), i.e. a pH regulator as described herein, and optionally one or more of components (a), (d), (e) and (f) as described herein,
combining (i) and (ii) into a substantially homogenous paste.

Further Aspect 15:
A method according to aspect 14, further comprising adding clay and/or modified clay to (i), (ii) and/or the substantially homogenous paste.

Further Aspect 16:
A method according to aspect 14 or 15, further comprising a step of:
adding the at least one functionality carrier as defined in any one of aspects 5-15 to (i), (ii) and/or the substantially homogenous paste.

Further Aspect 17:
A method for three-dimensional printing of an article, said method comprising the steps of:
(a) producing at least one layer comprising the composition according to any one of aspects 1-12 and/or produced in accordance with the method of any one of aspects 14-16,
(b) optionally combining several of said at least one layer, and
(c) curing said at least one layer.

Further Aspect 18:
Use of a composition according to any one of aspects 1-12, or obtainable by the method according to any one of aspects 14-16, in three-dimensional printing.

Further Aspect 19:
An article obtainable from three-dimensional printing of the composition according to any one of aspects 1-12 and/or by the method according to any one of aspect 17.

Further Aspect 20:
An article according to aspect 19 which is at least one of the following: headphone, prosthetic device, mold, decorative object, temporary object, furniture, wearables, biodegradable objects, facades, implants.

The invention is further illustrated by the following non-limitative examples.

EXAMPLES

Materials
Preparation of Materials for 3D Printing.
List of Material:

| Name | Suppliers | Specification |
|---|---|---|
| Kaolin | BASF | AVG. PARTICLE SIZE 2.5 μm-5 μm |
| Arbocel | J. Rettenmeier & Söne GmbH | Wood meal MAX PARTICLE SIZE 80 μm |
| Corn starch | Cargill | AVG. PARTICLE SIZE 20 μm |
| Sander dust | European MDF plant | MAX PARTICLE SIZE 150 μm |
| Sodium Algenate | Sigma Aldrich | CAS Number: 9005-38-3 |
| Prefere ExpL-3089 | Dynea | melamine urea resin containing more than 20 wt % melamine and having a molar ratio formaldehyde:amino groups of 0.9:1 or less |
| Micronised wax | Lubrizol | Melting point >100° C. |
| Formic acid | — | 85 wt % in water |
| Oxalic acid | — | Powder |
| Glycerol | Sigma Aldrich | 86 wt % in water |
| Elotex | Akzo-Nobel | — |
| Caprolactam | — | — |
| Wood fibres | MDF plant | — |
| Cellulose Fibres | | 10% paste |

In this document wt % refers to % by weight based in the total weight.

Example 1

Water (71.1 g), glycerol (13.4 g), formic acid (65.9 g), were mixed by Rodelys RS 300 stirrer at 250 rpm. Corn starch (184.7 g), kaolin (164.7 g) were added slowly (over 30 min) and simultaneously into the mix under stirring of 180 rpm to provide a first homogenous paste composition. In this document, rpm intends revolutions per minute.

Water (87.5 g) was added to Prefere ExpL-3089 (312 g) synthetic binder from Dynea under stirring of 300 rpm).

Micronised wax (2.5 g) and Arbocel (43.3 g) were stirred in the mix, at 130 rpm to provide a second homogenous paste composition.

Example 2

Water (104 g), oxalic acid (29 g), were mixed by Rodelys RS 300 stirrer at 250 rpm. Wood fibres (150), sander dust (97.7 g) were added slowly (over 30 min) and simultaneously into the mix under stirring of 180 rpm to provide a first homogenous paste composition.

Water (100 g) was added to Prefere ExpL-3089 (170 g) under stirring of 300 rpm. Caprolactam (2 g) and Arbocel (89.5 g) were stirred in the mix, at 130 rpm. Corn starch (37 g) was added to provide a second homogenous paste composition.

Example 3

Water (60 g), formic acid (15 g), were mixed by Rodelys RS 300 stirrer at 250 rpm. Arbocel (130 g) and kaolin (130 g) were added slowly (over 30 min) and simultaneously into the mix under stirring of 180 rpm to provide a first homogenous paste composition.

Water (100 g) was added Prefere ExpL-3089 (100 g) under stirring of 300 rpm and cellulose fibres (10 g) were added. Elotex (95 g) and Arbocel (130 g) were stirred in the mix, at 130 rpm to provide a second homogenous paste composition.

Example 4

Sander dust (320 g) was mixed with wood-fibres (64 g), corn starch (31 g) Prefere ExpL-3089 (120 g) and ammonium sulphate (14 g) to form a powder mixture for 3D printing.

Printing/Extruding Procedure

The pastes of Examples 1-3 were tested for three-dimensional printing as follows.

The first homogenous paste and the second homogenous paste were mixed in 50:50 (w/w) ratio in inline mixer at pressure of 2-5.5 bar, through a nozzle of 0.5-6 mm to be extruded into objects.

Objects with layer height from 2-7 mm and layer width of 2-7 mm, at speed of 3.5 s/cm were extruded. The layers were dried just after extrusion.

The dried objects were immersed into cold for 24 h and warm water (60° C.) for 4 hours.

There was no change in appearance or formation observed.

It was possible to drill a hole in the object, polish it, coat it and paint it.

Example 5

The powder mixture of Example 4 above was laid on the powder bed in Electro Optical Systems powder printer and with printer-head sprayed water between the layers. As a result, an object comprising layers was formed. The object was dried at room temperature for 24 hours. It was concluded that the powder mixture could be used in three-dimensional printing.

Example 6

Water (104 g), oxalic acid (29 g), were mixed by Rodelys RS 300 stirrer at 250 rpm. Wood fibres (150), sander dust from spruce panels (92.0 g) were added slowly (over 30 min) and simultaneously into the mix under stirring of 180 rpm to provide a first homogenous paste composition.

Water (101.7 g) was added to Prefere ExpL-3089 (174 g) under stirring of 300 rpm. Caprolactam (2 g) and Arbocel (89.5 g) were stirred in the mix, at 130 rpm. Corn starch (37 g) was added to provide a second homogenous paste composition.

Example 7

Water (104 g), oxalic acid (29 g), were mixed by Rodelys RS 300 stirrer at 250 rpm. Wood fibres (150), sander dust from amino resin bonded spruce MDF boards (97.7 g) were added slowly (over 30 min) and simultaneously into the mix under stirring of 180 rpm to provide the first homogenous paste composition.

Water (100 g) was added to Prefere ExpL-3089 (170 g) under stirring of 300 rpm. Caprolactam (2 g) and Arbocel (89.5 g) were stirred in the mix, at 130 rpm. Corn starch (37 g) was added to provide a second homogenous paste composition.

Example 8

Water (109 g), oxalic acid (30.5 g), were mixed by Rodelys RS 300 stirrer at 250 rpm. Wood fibres (150 g), sawing dust from amino resin bonded pine particle board (87.2 g) were added slowly (over 30 min) and simultaneously into the mix under stirring of 180 rpm to provide a first homogenous paste composition.

Water (100 g) was added to Prefere ExpL-3089 (174 g) under stirring of 300 rpm. Caprolactam (2 g) and Arbocel (89.5 g) were stirred in the mix, at 130 rpm. Corn starch (37 g) was added to provide a second homogenous paste composition.

Example 9

Water (106 g), oxalic acid (31.5 g), were mixed by Rodelys RS 300 stirrer at 250 rpm. Wood fibres (150), bamboo fibres (85 g) were added slowly (over 30 min) and simultaneously into the mix under stirring of 180 rpm to provide a first homogenous paste composition.

Water (100 g) was added to Prefere ExpL-3089 (179.2 g) under stirring of 300 rpm. Caprolactam (2 g) and Arbocel (89.5 g) were stirred in the mix, at 130 rpm. Corn starch (37 g) was added to provide second homogenous paste composition.

Example 10

The mixture from example 7 where the first composition was prepared by mixing Water (104 g) and oxalic acid (29 g) by Rodelys RS 300 stirrer at 250 rpm, and later added wood fibres (150), sander dust from amino resin bonded spruce MDF boards (97.7 g) over 30 min into the existing mix under stirring of 180 rpm to provide the homogenous paste composition.

The second composition was prepared by mixing Prefere ExpL-3089 (170 g) into water (100 g) under stirring of 300 rpm. Caprolactam (2 g) and Arbocel (89.5 g) were stirred in the mix, at 130 rpm. Corn starch (37 g) was added to provide second homogenous paste composition.

The first and the second composition were transferred into separate plastic patrons and were joined with Y-joint. Y-joint was connected to the Archimedes screw. Pressure was applied on the top of the patrons, and the two compositions were mixed in site prior to extrusion through nozzle of size of 7×5 mm. In this document, mm refers to millimetres. The layers that we extruded were in the size of ca 7×5 mm. The mixture was flowing at the point of extrusion, but as soon as it was laid on the extrusion surface, the mixture was stiff and if became hard on touch within a few seconds.

Example 11

In yet another example water (90 g), formic acid (19 g), were mixed by Rodelys RS 300 stirrer at 250 rpm. Wood fibres (150), sander dust from spruce panels (92.0 g) were added slowly (over 30 min) and simultaneously into the mix under stirring of 180 rpm to provide the first homogenous paste composition.

Water (101.7 g) was added Prefere ExpL-3089 (174 g) under stirring of 300 rpm. Caprolactam (2 g) and Arbocel (89.5 g) were stirred in the mix, at 130 rpm. Corn starch (37 g) was added to provide second homogenous paste composition.

The first and the second composition was transferred into separate plastic patrons, and we joined with Y-joint. Y-joint was connected to the Archimedes screw. Pressure was applied on the top of the patrons, and the two compositions were mixed in site prior to extrusion through nozzle with a diameter of 0.4 mm.

Layer of size achieve of 0.5 mm (width)×0.5 mm (height) was extruded, and it was cured by the extrusion of the next layer.

The invention claimed is:

1. A kit of parts for providing a composition in the form of a paste for three-dimensional printing, said composition being free from polylactic acid and comprising the following components:
   (a) a polysaccharide comprising a cellulose derivative and/or a lignocellulosic derivative selected from at least one of the following: a wood fiber, sander dust, sawing dust, a lignocellulosic fiber, a lignocellulosic paste, a lignocellulosic powder, a cellulose powder, a cellulose paste, a cellulose fiber, a regenerated cellulose, and a lignocellulosic composite;
   (b) a pH regulator selected from at least one of the following: an organic acid, an inorganic acid, an acid generating salt, a buffer, an acidic polymer, and a base;
   (c) a resin selected from a melamine resin and/or a phenol resin;
   (d) a rheology modifier selected from water and/or glycerol; and
   (f) an organic filler selected from at least one of the following: a cellulose fiber, algenite, cork, latex, wax, shellac, and gum arabic;
wherein said kit of parts comprises:
   (i) a first component comprising said pH regulator; and
   (ii) a second component comprising said resin,
   wherein said first component and/or said second component further comprise(s) said polysaccharide;
   wherein said first component and said second component further comprise said rheology modifier thereby providing said first component as a paste and said second component as a second paste; and
   wherein said first component and/or said second component further comprise(s) said organic filler.

2. A kit according to claim 1, wherein the resin comprises melamine urea formaldehyde and/or melamine formaldehyde.

3. A kit according to claim 1, wherein said first and/or said second component further comprise at least one of the following components:
   (e) a binder selected from at least one of the following: starch, lignin, and a protein,
   (g) a functionality carrier selected from at least one of the following: metallic particles, carbon, glass particles, and caprolactam, and
   (h) a further rheology modifier selected from at least one of the following: an acrylic polymer, an alginate, a gum derived from cellulose, and a cellulose fiber.

4. A kit according to claim 1, wherein the amount of the components based on the total amount of the composition is:
   from 10 wt % to 87 wt % of the polysaccharide comprising a cellulose derivative and/or lignocellulose derivative,
   from 0.1 wt % to 10 wt % of the pH regulator,
   from 5 wt % to 70 wt % of the resin and a binder selected from at least one of the following: starch, lignin, and a protein,
   from 1 wt % to 10 wt % of the organic filler,
   0.1 to 10 wt % of a functionality carrier selected from at least one of the following: metallic particles, carbon, glass particles, and caprolactam,
   water, glycerol and/or binder present in an amount up to 100 wt % of the balance of the composition.

5. A kit according to claim 1, wherein said composition is biodegradable.

6. A kit according to claim 1, wherein said composition is capable of three-dimensional printing at room temperature.

7. A kit according to claim 1, wherein said composition is capable of three-dimensional printing without heating and/or cooling.

* * * * *